United States Patent [19]
Jacobs

[11] 3,927,977
[45] Dec. 23, 1975

[54] LIQUID CRYSTAL GAS ANALYZER
[75] Inventor: John E. Jacobs, Evanston, Ill.
[73] Assignee: The United States of America as represented by the Secretary of the Department of Health, Education and Welfare, Washington, D.C.
[22] Filed: Sept. 20, 1974
[21] Appl. No.: 507,991

[52] U.S. Cl. ..... 23/230 LC; 23/254 R; 350/160 LC
[51] Int. Cl.² .................. G01N 31/06; G01N 33/16; G02F 1/01; G02F 1/13
[58] Field of Search ........ 23/230 LC, 254 E, 254 R; 350/160 LC

[56] References Cited
UNITED STATES PATENTS
| | | | |
|---|---|---|---|
| 3,409,404 | 11/1968 | Fergason | 23/254 R X |
| 3,656,909 | 4/1972 | Dixon et al. | 23/230 LC X |
| 3,719,789 | 3/1973 | Harnden, Jr. | 350/169 LC |

OTHER PUBLICATIONS
Fergason, J. L., Scientific American, August, 1964, pp. 77 to 82, and 85 relied on.

Primary Examiner—Robert M. Reese
Attorney, Agent, or Firm—Browdy and Neimark

[57] ABSTRACT

A liquid crystal gas analyzer comprises a liquid crystal film, a means for illuminating the film, a phototransistor for detecting the intensity of the light reflected from the film and a means to cause a gas to contact the film. Once the liquid crystal is subjected to the gas to be analyzed, the two diodes are pulsed and the phototransistor detects the intensity of the light reflected from the crystals. Since the crystals exhibit a different optical response for different concentrations of the same gas, the concentration of the gas which the liquid crystals have been subjected to can be determined.

7 Claims, 7 Drawing Figures

LIQUID CRYSTAL GAS ANALYZER

FIELD OF THE INVENTION

The present invention relates to an instrument which is used to monitor the concentration of the gases used in anesthesia during a surgical operation. In particular, the disclosed invention responds to the different concentrations of halothane.

BACKGROUND OF THE INVENTION

The discovery and use of anesthesia through the use of a numbing agent for the central nervous system was one of the major breakthroughs in modern surgery. Without it, many of the surgical techniques now prevalent in medicine would not be possible. However, advantageous as its use might be, care must still be taken in monitoring the inhalation of the anesthetic agent since an excess in concentration of the anesthetic agent may seriously or even fatally poison the patient.

Halothane (2-bromo-2 chlor-1:1:1-trifluoroethane) is one of the most desirable of these anesthetic agents due to its high degree of potency and ease with which the anesthesia may be induced, in addition to its non-explosive character. However, like other halogenated anesthetic gases, halothane is a cardiac depressive and thus special care must be taken in its use. Generally speaking, the halothane volume ratio used in inducing anesthesia in pre-operation goes from 0.5% up to a maximum of 3%. This lasts for approximately 3 to 5 minutes, and then for maintenance of the anesthesia generally are employed ranges from 0.5% to 1.5% for as long as the operation lasts. During this time, the patient must be carefully monitored since exposure of the patient to halothane of a concentration in excess of 3% for any sustained period may prove to be fatal.

Previously, the concentration of halothane in the gas has been detected by devices utilizing infra-red absorption of the halothane gas. However, these devices have proven to be somewhat unreliable since they are seriously limited in their sensitivity and their utility by the infrared absorption of the nitrous oxide gas normally used in conjunction with halothane during the anesthesia induction. The use of a liquid crystal as the primary detecting element removes this sensitivity problem due to nitrous oxide inasmuch as the liquid crystal optical properties are in no way affected by such inorganic gases as nitrous oxide.

SUMMARY OF THE INVENTION

It is, accordingly, an object of the present invention to overcome the defects of the prior art, such as indicated above.

Another object is to develop a liquid crystal gas analyzer which is not affected by the presence of nitrous oxide in the anesthetic gas.

A further object is to provide a detector of anesthetic gasses based upon the optical rotation of liquid crystals.

Before proceeding with a more detailed discussion of the device, the term "Liquid Crystal" must be clarified. A substance is called liquid if it flows and takes the shape of its container, whereas a crystal is generally thought of as being a rigid solid. However, when certain organic solids are heated, they pass first into a stable mesomorphic state before reaching the isotropic liquid state. This mesomorphic state is characterized by some interfacing properties, properties between those of crystalline solids and isotropic liquids. The former display the optical properties of solids, and the latter display the mechanical properties of liquids. This mesomorphic state has been named a liquid crystal state and the compounds exhibiting this state are the "Liquid Crystals" referred to in the present invention.

These liquid crystals were first observed in 1888 by the Austrian botanist, Frederick Reinitzer, and their optical properties were first described by the German physicist O. Lehmann in 1889. Research in this field reached a peak in the early 1930's, but interest waned until just a few years ago when this field again regained prominence, due primarily to the efforts of Brown and Fergason at the Liquid Crystal Institute at Kent State University at Kent, Ohio, and also of Gray in England. The cause of this recent growth of interest in liquid crystals is its increasing significance in biomedical and industrial applications. This significance can be attributed to the remarkable ability of the liquid crystals to register minute fluctuations in temperature, mechanical stress, electromagnetic radiation and chemical enviroment by changing their color. This change of color is due to the optical rotation of the liquid crystals when they are struck by a light source. This phenomenon has been utilized in the present invention.

For a better understanding of the invention, a possible embodiment thereof will now be described with reference to the attached drawing, it being understood that this embodiment is exemplary only and not limitative.

DETAILED DESCRIPTION OF THE DRAWING

Liquid crystals which are formed by heating (the thermotropic type) are classified into three distinct phases: the smectic phase, the nematic phase, and the cholesteric phase.

Figures 1A, 1B:
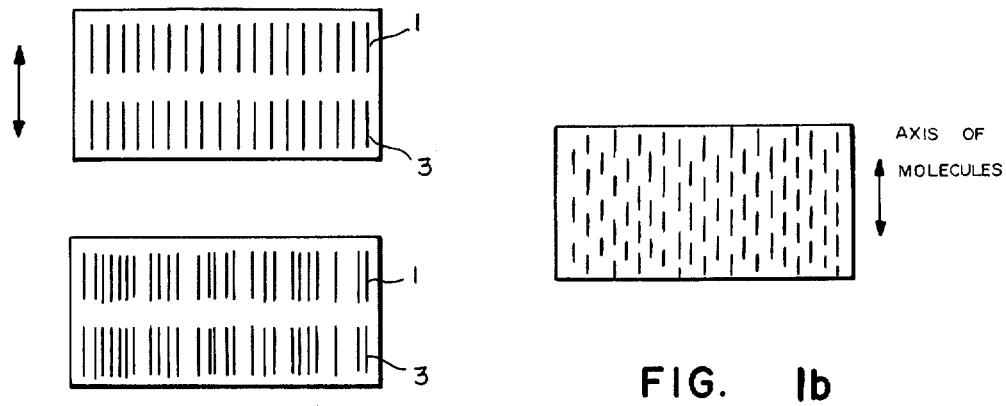
FIG. 1a shows the arrangement of the molecules of a liquid crystal in the smectic phase.
FIG. 1b shows the arrangement of the molecules of a liquid crystal in the nematic phase.

In the smectic phase, the structure consists of layers in which the molecules are arranged either in rows or at random. As shown in FIG. 1a, the long axes of the molecules in each layer are perpendicular to the plane of that layer. The layers 1 and 3 are free to slide over one another, giving the substance the mechanical properties of a two dimensional fluid.

In the nematic phase, the structure is less highly organized than in the smectic phase. Molecules are arranged with all their long axes parallel, but as indicated in FIG. 1b they are not separated into layers.

Figure 2:
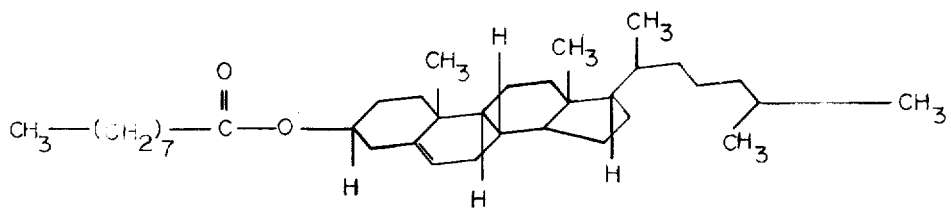
FIG. 2 shows the structure of the cholesteryl nonanoate liquid crystal.
Figure 1C:
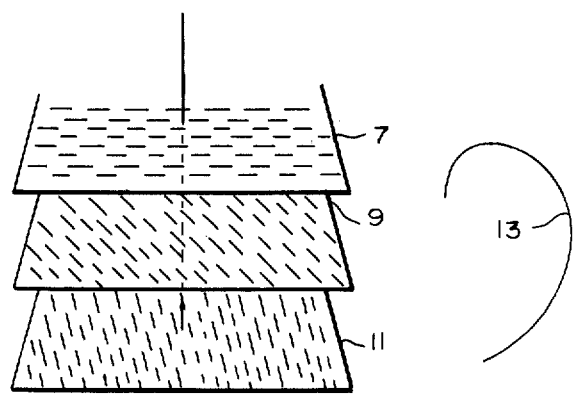
FIG. 1c shows the arrangement of the molecules of a liquid crystal in the chlorestic phase.

As in the smectic phase, the molecules of the chlorestic phase are arranged in layers, shown in FIG. 1c; within each layer 7, 9, and 11, the parallel alignment of the molecules is reminiscent of the nematic phase. The molecular layers in a chlorestic substance are very thin, with the long axes of the molecules parallel to the plane of the layers. The individual molecules are essentially flat, with a side chain of methyl groups ($CH_3$) projecting upward and hydrogen (H) downward from the plane of each molecule (FIG. 2). This unusual configuration causes the long axes of the molecules in each layer to be displaced slightly from the corresponding direction in adjacent layers. This displacement is cumulative through successive layers, so that the overall displacement traces out a helical path 13.

These liquid crystalline materials are optically anastropic; that is, they can transmit light waves of different velocities in different directions, the anastropy being uniaxial in all three liquid crystalline structures. In other words, there is only one direction in which the light vibrating parallel to the crystals travels either faster or slower than the light vibrating in a direction perpendicular to it. In the smectic and nematic phases, the velocity of light transmitted perpendicular to the layers is less than that transmitted parallel to the layers; whereas in the cholesteric phase, the velocity of light vibrating perpendicular to the molecular layers has a maximum velocity.

In addition, the liquid crystals are doubly refracting or birefringent. When ordinary light, which vibrates in all directions, hits the surface of a birefringent material, the beam is generally broken into two polarized components which vibrate at right angles to each other and travel at different speeds. Thus, when the white light strikes the surface of a cholesteric substance, it is separated into two components, one rotating clockwise and the other rotating counter-clockwise. Depending upon the type of cholesteric substance, one component is reflected on the surface at one frequency (or color), while the other component is transmitted and is at another frequency (or color). Because of this property, cholesteric substances when illuminated with white light show a characteristic iridescence.

These optical properties in the cholesteric substance enable it to respond to a subtle change in its environment by showing a variation in color. These environmental changes could be a change in temperature, chemical vapor concentrations, mechanical stress, and electrical and mechanical field differences. The present invention utilizes the chemo-optical response of the cholesteric liquid crystals to chemical vapors. Although most cholesteric substances are colorless, they pass through a series of bright colors when the concentration of a particular gas contacting them is varied. With the addition of a minute amount of certain vapors, the basic molecular structure of the liquid crystal is changed thereby altering its reflecting properties. In this regard, it is very important to note that at the same concentration of a gas, the cholesteric substance will always exhibit the same color. This means that different mixtures of cholesteric substances could produce any desired vapor-color combination. Since the liquid crystals merely serve as a solvent for the vapor, this color change will be reversible. However, if the vapor reacts chemically with the liquid crystals or serves as a catalyst for some other reaction, the color change will be non-reversible.

Figure 3:
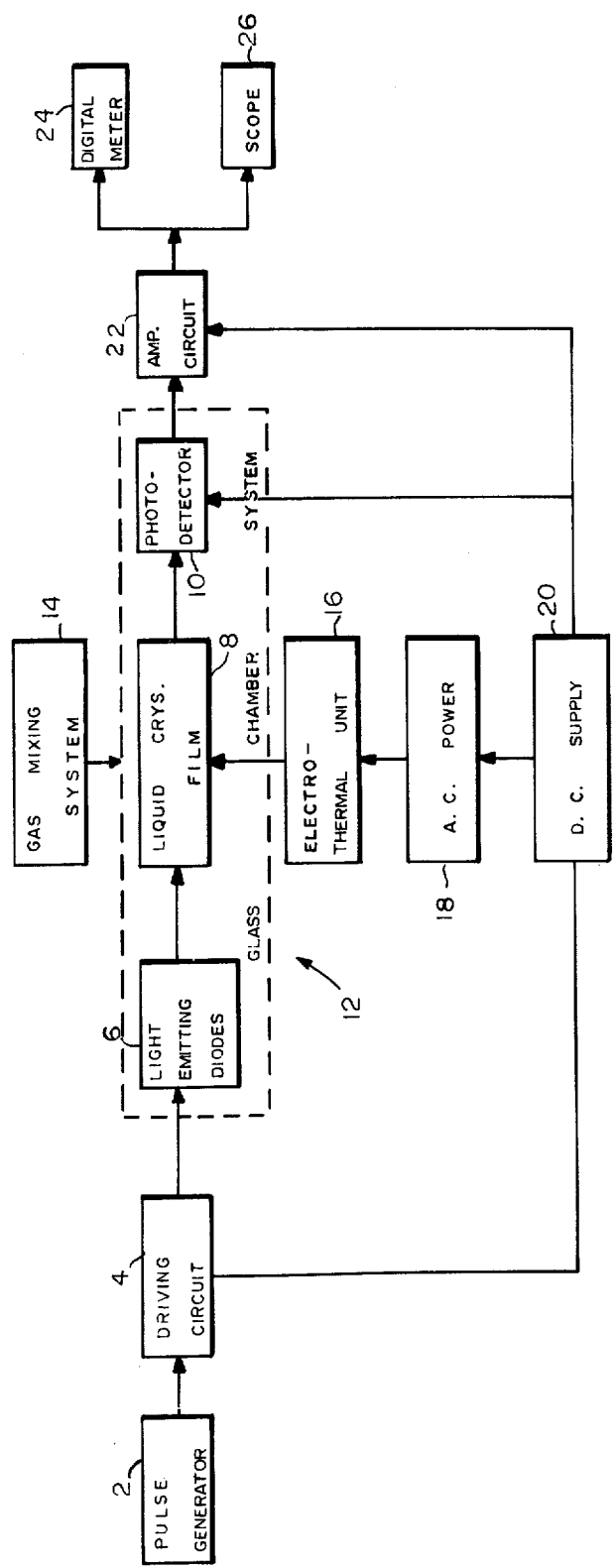
FIG. 3 shows the general block diagram of the liquid crystal gas analyzer of the present invention.
Figure 4:
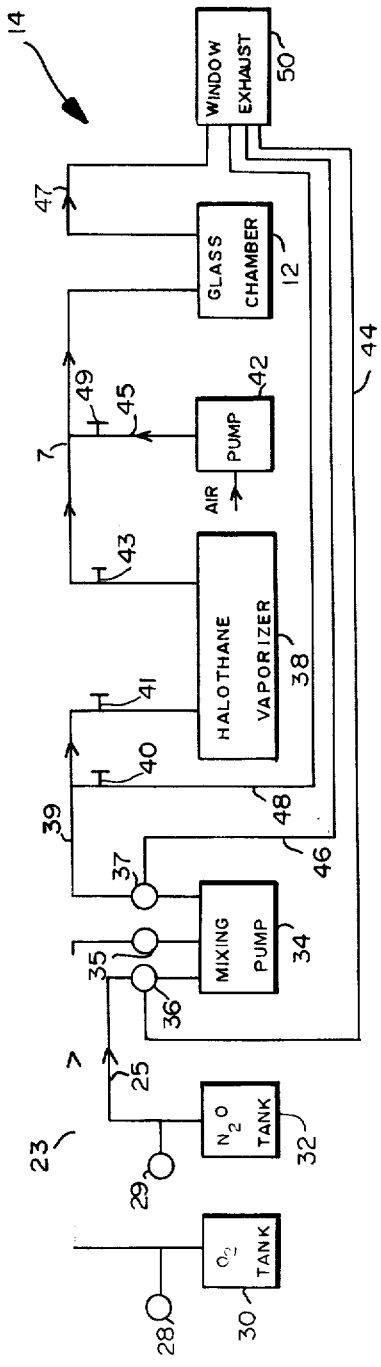
FIG. 4 shows the block diagram of the gas mixing system of the present invention.
Figure 5:
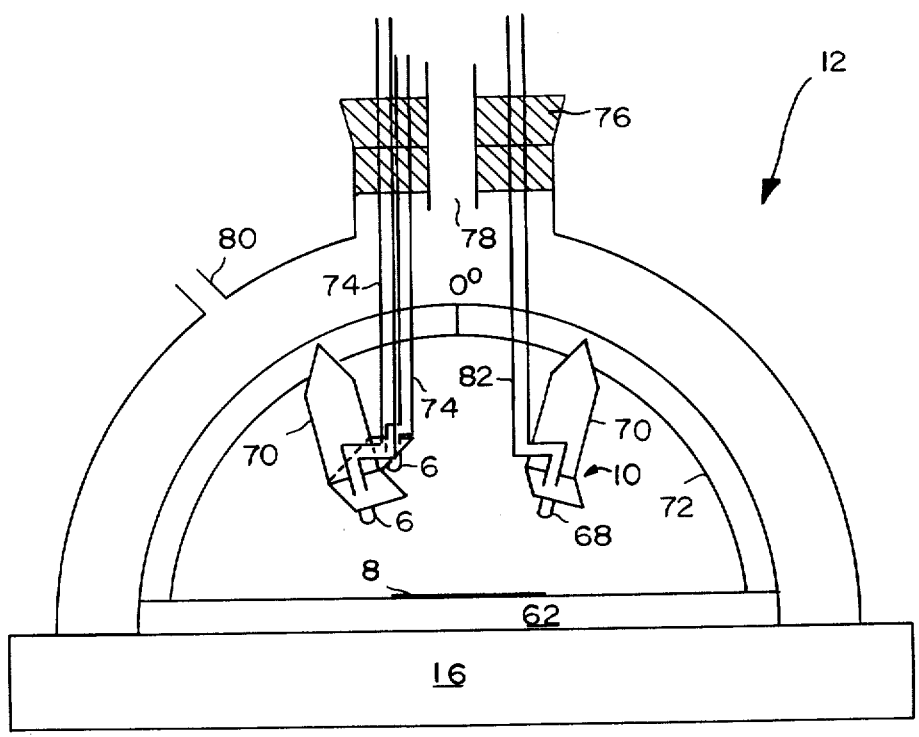
FIG. 5 shows a front elevational cut-away view of the glass chamber of the present invention.

Referring now to FIGS. 3, 4, and 5, this chemo optical property of the cholesteric substance (optical rotation) can be utilized in the determination of different concentrations of an organic gas. The intensity of the reflected light from a liquid crystal film, which is exposed to an organic vapor and a monochromatic light source, will vary due to the chemo-optical properties of the liquid crystal. As the reflected color pattern of a certain liquid crystal varies, thermally or chemically, from black through brown, pink, orange, yellow, green, blue, violet and then black or in the reverse order, the reflected light will exhibit a peak in intensity when the liquid crystal film shows a pink color, if the monochromatic source is red or infrared light. Similarly the reflected light will be maximized when the film, illuminated by green light, passes through the green phase. Thus adjusting the liquid crystal thermo-optically to the proper range for a given color monochromatic incident light will allow measurements of gas concentration through the minute variations around the peak intensity of reflected light caused by the chemo-optical property of the liquid crystal.

FIG. 3 shows a general block diagram of the halothane detection system. A pulse generator 2, driven by a driving circuit 4, supplies a sequential pulse to light emitting diodes 6 contained in a glass chamber system 12. Light reflected off a liquid crystal film 8, which has been subjected to a mixture of $O_2$, $N_2O$ and halothane gas introduced to the glass chamber system 12 via the gas mixing system 14, is detected by a photodetector 10.

The information supplied to the photodetector 10 is then amplified by the amplifier circuit 22 and may be displayed on either a digital meter 24 or oscilloscope 26. This output is in the form of an electrical voltage, every concentration of the gaseous substance exhibiting its own unique voltage, with this voltage increasing linearly with an increase in concentration.

The liquid crystal film 8 is kept at a constant specified temperature by the utilization of a conventional electro-thermal unit 16 powered by a D.C. supply 20 and A.C. power unit 18.

The gas which is to be tested can be prepared in any standard gas mixing system 14 such as shown in FIG. 4. In this system a mixture consisting of almost 50% oxygen and 50% nitrous oxide which are pumped from their respective tanks 30 and 32 into a mixing pump 34 via gas flow lines 23 and 25 respectively.

Each tank is regulated by a regulator 28 and 29 respectively, and the pressure in the mixing pump 34 is adjusted by means of pressure buffers 35, 36, and 37. Buffer 36 allows the nitrous oxide in tank 32 to pass either to the mixing pump 34 or if the percentage of nitrous oxide in the mixing pump is higher than the desired value, it will allow it to travel directly to the window exhaust 50, through gas exhaust line 44. Pressure buffer 37 is connected to the window exhaust 50 by means of gas line 46 and also to the halothane vaporizer 38 by means of gas line 39, where the halothane gas is mixed with the $O_2$ and $N_2O$ mixture. In addition, the mixed gas may be pumped to the window exhaust by way of line 48 regulated by clamper 40, thus assuring that only the proper concentration of the $O_2$ and $N_2O$ mixture is pumped into the halothane vaporizer 38, regulated by clamps 41 at the entrance and 43 at the exit.

The Halothane, $O_2$ and $N_2O$ combination is then mixed with air introduced into gas line 45 by action of pump 42 which is controlled by clamper 49. These chemical vapors are then introduced into the glass chamber 12 through line 7 after which the gasses are exhausted through line 47 into the window exhaust 50.

Once the gas is introduced into the glass chamber 12, the two light emitting diodes 6 are sequentially pulsed by means of a square wave pulse generator 2 of approximately 15 volts and 100 hz in reverse connection with the diodes 6 applied to them, through the standard driving circuit 4.

The advantage of using two diodes is that the sensitivity of the liquid crystal to gaseous atmosphere varies with the light which is used to read the optical rotation. This sensitivity is dependent upon the wave length of the light used, the temperature and the crystal composition. In the instant invention one LED is pulsed on the positive cycle of the square wave, and the other on the negative cycle. This permits the determination the ratio of these two different wave lengths and tends to eliminate the temperature drift, thus increasing liquid crystal sensitivity. In this case, a red LED and infrared LED of 6300 angstroms and 8200 angstroms respectively were used. However, it should be noted that other light emitting diodes may be used to obtain the desired spectra of the light sources.

The light emitted by the LED's 6 is directed to the liquid crystal film 8 and the light reflected off it is picked up by the conventional photodetector system 10, containing a phototransistor 68 which converts the light energy into electrical energy and is then amplified by circuit 22. After the signal is amplified, any suitable outlet means such as digital meter 24 or scope 26 may be used to record the differential output of the system.

The glass chamber system 12 is shown in more detail in FIG. 5. As previously stated, the optical rotation of the liquid crystals varies in response to subtle changes in the surrounding temperature. Thus, it is imperative that the environmental temperature of the glass chamber system 12 remain constant. To this end, the electrothermal unit 16 is placed in the glass chamber system 12 under the liquid crystal film 8 and separated by a good conductor, such as the copper plate 62. The unit 16 can be powered by any standard D.C. supply 20 and A.C. power unit 18. The chamber contains two light emitting diodes 6 and a phototransistor 68. The light emitting diodes 6 are connected by electrical connections 74 to the driving circuit 4, and the phototransistor 68 is also connected by electrical wires 82 to the amplifier circuit 22. The diodes 6 and phototransistor 68 are supported in place by a plastic supporter 70 adapted to keep them as steady as possible. The gas is injected into the chamber by way of inlet 78 and may be exhausted through outlet 80. A rubber stopper 76 is provided to ensure that the entire system 12 is airtight. A protractor 72 is also provided in the chamber to ensure that the diodes and the phototransistor are correctly positioned.

The liquid crystal sample used in this device is a derivative of chlorestal with a temperature range of 35°–37 °C., and is a product of Liquid Crystal Industrial, Inc. Company policy allows it to neither disclose the exact chemical structure nor the approximate ingredients of the crystal. Since the thickness and smoothness of the liquid crystal film affects the vapor color pattern and the response time, care must be taken in applying the film. For the thicker areas on a film, a slower response and different color is observed compared with those of the thin areas of the same film. A liquid crystal film of constant thickness of approximately 100 micrometers appears to be adequate in this regard.

Tests were performed using the above-mentioned liquid crystal material over the temperature range of 35°C. to 37°C. The output voltage of the phototransistor 68 was shown to increase linearly for a linear increase in % of halothane in the mixture of gasses also including $N_2O$. This linear increase occurred over at range of concentrations of halothane gas from at least <0.5% to >5%. Thus the present liquid crystal gas analyzer is suitable for the measuring of halothane concentrations in the range of concentrations desirable for the monitoring of anesthesia induction and is not affected by $N_2O$ concentrations.

Although the present invention has been described with a certain degree of particularity, it is understood that the present invention is made by way of example and changes in detail and structure may be made without departing from the spirit thereof.

I claim:

1. A liquid crystal gas analyzer comprising:
   liquid crystal film;
   illuminating means for illuminating the liquid crystal film, said illuminating means including first and second light emitting diodes;
   detector means for detecting the intensity of light reflected from the liquid crystal;
   injection means for causing a gas to come in contact with said liquid crystal; and
   output means, connected to said detector means, for recording the intensity of reflected light detected by said detecting means.

2. The liquid crystal gas analyzer of claim 1 further including:
   heating means to keep said liquid crystal at a constant temperature.

3. The liquid crystal gas analyzer of claim 2 wherein said heating means comprises an electrically heated plate.

4. The liquid crystal gas analyzer of claim 1 wherein said gas is an anesthetic including halothane and $N_2O$.

5. The liquid crystal gas analyzer of claim 1 further including multiplexing means connected to said illumination means for alternatingly pulsing said first and second light emitting diodes.

6. The liquid crystal gas analyzer of claim 1 wherein the wavelengths of said first and second light emitting diodes are different.

7. The liquid crystal gas analyzer of claim 6 wherein said first light emitting diode emits light with a wavelength of approximately 6300 angstroms and said second light emitting diode emits light at approximately 8200 angstroms.

* * * * *